(12) United States Patent
Wang et al.

(10) Patent No.: US 12,179,968 B2
(45) Date of Patent: Dec. 31, 2024

(54) FORMABLE STOPPER

(71) Applicant: FIVETECH TECHNOLOGY INC., New Taipei (TW)

(72) Inventors: Ting-Jui Wang, New Taipei (TW); Chih-Wei Lin, New Taipei (TW)

(73) Assignee: FIVETECH TECHNOLOGY INC., New Taipei (TW)

( * ) Notice: Subject to any disclaimer, the term of this patent is extended or adjusted under 35 U.S.C. 154(b) by 247 days.

(21) Appl. No.: 17/964,068

(22) Filed: Oct. 12, 2022

(65) Prior Publication Data

US 2023/0173600 A1    Jun. 8, 2023

(30) Foreign Application Priority Data

Dec. 2, 2021 (TW) .................. 110144998

(51) Int. Cl.
*F16B 39/02* (2006.01)
*B65D 47/40* (2006.01)

(52) U.S. Cl.
CPC .................. *B65D 47/40* (2013.01)

(58) Field of Classification Search
CPC .... F16B 58/1045; F16B 58/10; F16B 13/122; F16B 13/12; B65D 47/40
USPC .............................................. 138/89; 411/69
See application file for complete search history.

(56) References Cited

U.S. PATENT DOCUMENTS

| | | | | |
|---|---|---|---|---|
| 4,357,960 A | * | 11/1982 | Han ................. | F16L 55/1608 138/97 |
| 4,607,469 A | * | 8/1986 | Harrison ............ | F16L 5/02 52/220.8 |
| 4,751,947 A | * | 6/1988 | Landers ............. | H02G 9/06 141/1 |
| 4,865,080 A | * | 9/1989 | Lundquist ........... | B25B 31/00 220/234 |
| 5,490,365 A | * | 2/1996 | Roth ................. | F16B 11/006 52/707 |
| 5,749,670 A | * | 5/1998 | Astor ................ | F16B 37/14 411/930 |
| 5,807,051 A | * | 9/1998 | Heminger ........... | F16B 13/141 411/903 |
| 6,457,910 B1 | * | 10/2002 | Ludwig .............. | E21D 21/0033 405/269 |
| 8,051,524 B2 | * | 11/2011 | Ferreira Lino ...... | F16L 55/38 15/104.19 |
| 8,061,388 B1 | * | 11/2011 | O'Brien ............. | F16L 55/1011 166/292 |
| 8,104,248 B2 | * | 1/2012 | Gillis ............... | F16B 25/0031 52/745.05 |

(Continued)

*Primary Examiner* — Gary W Estremsky

(57) ABSTRACT

A formable stopper applied to a fixing structure comprises a body having an assembly hole or an assembly section. The assembly hole or the assembly section includes a placement portion and an assembly portion. The assembly portion is in communication with or connected to the placement portion, or the placement portion is the assembly portion. The formable stopper further comprises a formable body. The formable body is adapted to be extruded, placed, or fitted into the placement portion, and extruded, placed, or fitted into the assembly portion, so as to form an interference structure or to form an interference force for preventing or avoiding the formable body from falling out of the assembly hole.

11 Claims, 6 Drawing Sheets

(56) References Cited

U.S. PATENT DOCUMENTS

2011/0137263 A1\* 6/2011 Ashmead ............ A61M 5/3202
  604/230
2018/0321271 A1\* 11/2018 Kauffmann ........ G01N 35/1002

\* cited by examiner

FORMABLE STOPPER

CROSS-REFERENCE TO RELATED APPLICATION

This non-provisional application claims priority under 35 U.S.C. § 119(a) on Patent Application No(s). 110144998 filed in Taiwan, R.O.C. on Dec. 2, 2021, the entire contents of which are hereby incorporated by reference.

BACKGROUND OF THE INVENTION

1. Field of the Invention

The present disclosure provides a formable stopper, and in particular to a formable stopper for preventing solder from flowing into an assembly area.

2. Description of the Related Art

A coupling device for assembling a counterpart piece is typically formed by a body having a hollow portion, and an insertion portion provided on one end of the body. During use, a solder layer is provided on a fixing hole of a plate, the insertion portion on one end of the body is inserted into an insertion hole of the plate so that the solder layer matches the insertion portion and is secured in the insertion hole, and then the counterpart piece is placed into the hollow portion of the body, thereby achieving an effect of assembling the counterpart piece.

Although the conventional coupling device above achieves an effect of assembling the counterpart piece, the hollow portion of the body does not contain any stopping means. Thus, when the insertion portion on one end of the body is inserted into the insertion hole of the plate for soldering, the solder layer may be pressed by an edge of the insertion portion and receive a solder adsorption effect of the solder layer and a solder bonding layer of an outer plating layer of the body, and thus enters the hollow portion of the body. As such, when the counterpart piece is assembled to the hollow portion of the body, the counterpart piece may not be successfully placed into the hollow portion due to the interference of the solder layer, resulting in combination complications.

In a current measure for preventing the solder layer from entering the hollow portion of the body, a block member is arranged at a bottom of the hollow portion, wherein the block member can be assembled to the body during manufacturing of the body. However, it is discovered that, before the body is installed to the plate, the attached block member may have already fallen off due to vibration, hence failing a function of preventing the solder layer from flowing into the body.

BRIEF SUMMARY OF THE INVENTION

With extensive research and development, the applicant provides a formable stopper which does not fall off from a corresponding body portion, thereby implementing an effect of blocking a solder layer from flowing into an assembly portion of a body.

The present disclosure provides a formable stopper applied to a fixing structure. The fixing structure includes a body having an assembly hole or an assembly section. The assembly hole or the assembly section includes a placement portion and an assembly portion. The assembly portion is in communication with or connected to the placement portion, or the placement portion is the assembly portion. The formable stopper includes a body, for example, a formable body. The formable body is adapted to be extruded, placed, or fitted into the placement portion, and extruded, placed, or fitted into the assembly portion, so as to form an interference structure or to form an interference force for preventing or avoiding the formable body from falling out of the assembly hole or the assembly section.

Thus, with the sufficient interference force provided by the interference structure, the formable stopper of the present disclosure is prevented from falling out of the corresponding body portion, thereby achieving the effect of blocking the solder layer in a liquid state from flowing into the assembly portion of the body. A formable stopper according to another embodiment of the present disclosure can be combined to a placement portion, so as to serve as a fixing structure to be picked up to a soldering position by a tool.

DETAILED DESCRIPTION OF THE INVENTION

To facilitate understanding of the objectives, characteristics, and effects of this present disclosure, embodiments together with the attached drawings for the detailed description of the present disclosure are provided.

Embodiments of the present disclosure are provided below.

Figure 1:
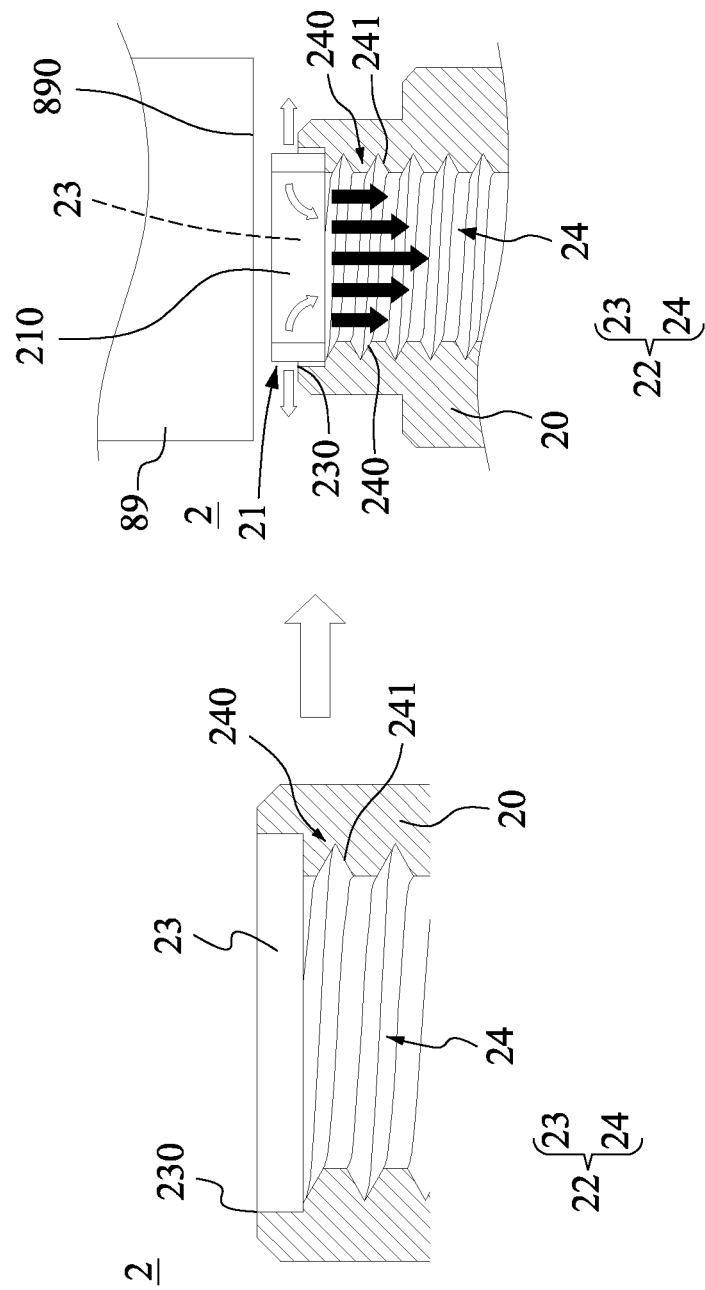
FIG. 1 is a schematic diagram of actions of installing a formable stopper to a fixing structure according to an embodiment of the present disclosure.
Figure 2:
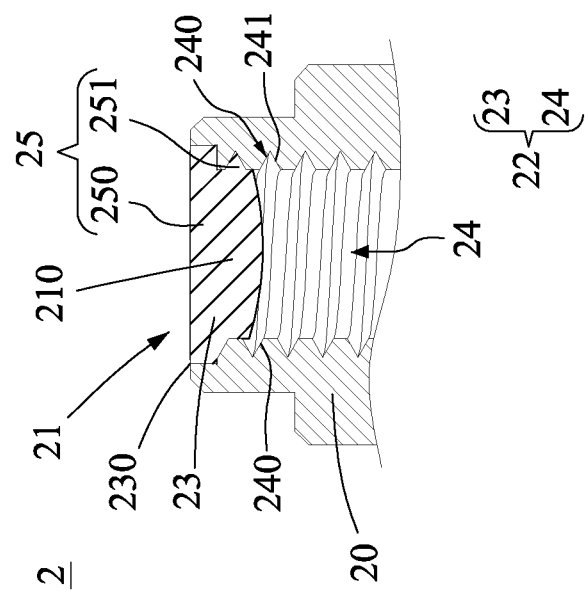
FIG. 2 is a sectional schematic diagram of the fixing structure installed with the formable stopper of the present disclosure.

Referring to FIG. 1 and FIG. 2, the present disclosure provides a formable stopper 21 applied to a fixing structure 2. The fixing structure 2 includes a body 20 having an assembly hole 22. The assembly hole 22 includes a placement portion 23 and an assembly portion 24. The placement portion 23 is located at a bottom portion of the body 20 and has a placement opening 230. The assembly portion 24 is in communication with the placement portion 23 and passes through the body 20. The formable stopper 21 includes a formable body 210. The formable body 210 is adapted to be extruded, placed, or fitted into the placement portion 23, and extruded, placed, or fitted into the assembly portion 24, so as to form an interference structure 25 or to form an interference force for preventing or avoiding the formable body 210 from falling out of the assembly hole 22. Specifically, the formable stopper 21 is extruded, placed, or fitted into the placement portion 23 or the assembly portion 24 by applying an external force.

Referring to FIG. 1 and FIG. 2, in an embodiment, the assembly portion 24 includes a thread structure 240. Thus, the formable body 210 is adapted to be continually extruded into the thread structure 240 to form the interference structure 25.

Figure 3:
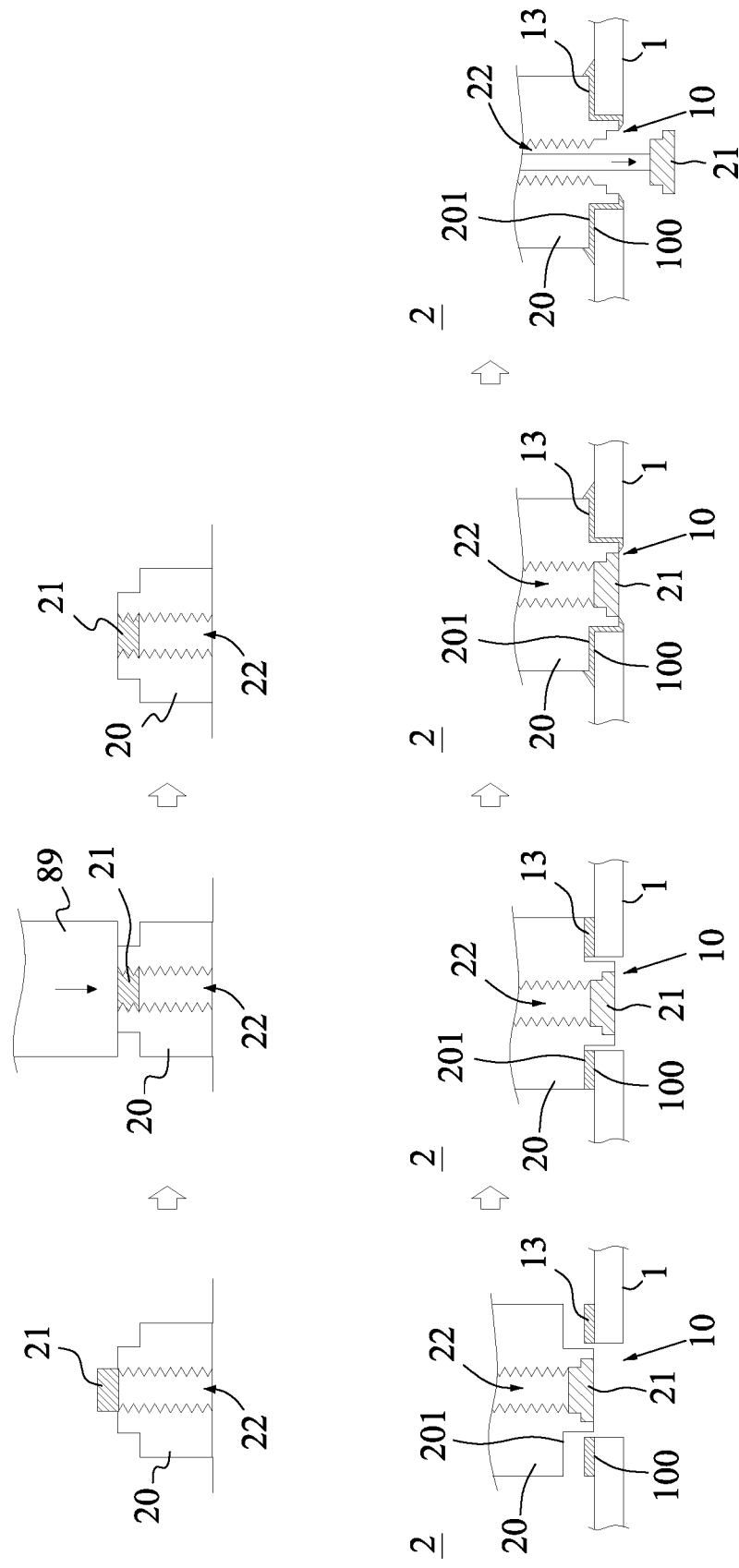
FIG. 3 is a schematic diagram of actions of installing a formable stopper to a fixing structure and soldering the fixing structure to an object according to an embodiment of the present disclosure.

Referring to FIG. 1 to FIG. 3, in an embodiment, the formable stopper 21 is for preventing liquid solder (a solder layer 13 in a liquid state when heated) heated during a soldering process from flowing into the thread structure 240.

Referring to FIG. 1 to FIG. 3, in an embodiment, the formable stopper 21 is for preventing liquid solder heated during a soldering process from flowing into the structure of the assembly portion 24.

Referring to FIG. 1 to FIG. 3, in an embodiment, the formable stopper 21 is for preventing liquid solder heated during a surface mounting and soldering process from flowing into the structure of the assembly portion 24.

As described above, with the sufficient interference force provided by the interference structure, the formable stopper 21 of the present disclosure is prevented from falling out of the corresponding body 20, thereby achieving the effect of blocking the solder layer 13 in a liquid state from flowing into the assembly portion 24 of the body 20.

As shown in FIG. 1 and FIG. 2, in an embodiment, the formable body 210 is made of Teflon, nylon, silicone, rubber, plastic, metal or other heat-resistant and deformable materials, which do not fall off, fall out, melt, or deform during implementation in a soldering and heating process or a surface mounting, soldering, and heating process. The interference structure 25 includes a filling portion 250 filling the placement portion 23 and an interference portion 251 embedded into the assembly portion 24. A push member 89 may be used to push the formable stopper 21 into the placement portion 23 and the assembly portion 24. The push member 89 may have a push surface 890 for contacting the formable stopper 21, and a pushing force may be implemented manually or by a machine powered by such as oil pressure or air pressure. When the push member 89 pushes the formable stopper 21, an outer edge of the formable body 210 of the formable stopper 21 is stopped by the bottom portion of the placement portion 23 and fills a material toward an edge of the placement portion 23, and an unblocked center portion of the formable body 210 fills the assembly hole 22 downward. Once the placement portion 23 is filled, excess formable body 210 may overflow outward from the placement portion 23 and produce a burr. The placement portion 23 or the assembly portion 24 may be a radius corner, a chamfered corner, an arched corner, a concave, a convex, a stepped portion, an inclined surface, a column, a screw rod, a toothed portion, a curved surface, an elastic fastener, a block, a hollow body, a post, or a thread body, and the placement portion 23 and the assembly portion 24 are the same structure, or the placement portion 23 is the assembly portion 24. To correspond to the placement portion 23, the formable body 210 may be a sheet, a washer, an elastic body, a radius body, a chamfered body, a right-angled body, an arched body, a concave body, a convex body, a stepped body, an inclined surface body, a toothed body, a circular body, a fastener, a spherical body, a curved body, or a thread body.

As shown in FIG. 1 and FIG. 2, in an embodiment, the interference portion 251 is at least embedded into a thread 241 of the thread structure 240 closest to the placement portion 23. Thus, the interference structure 25 can withstand a pushing force of at least 0.35 kgf. Specifically, the interference force generated between the filling portion 250 and a perpendicular wall surface between the placement portion 23 and the assembly portion 24 can withstand a pushing force of about 0.05 kgf to 0.2 kgf. When the interference portion 251 is embedded into the thread 241, the interference force can be increased to a level of withstanding the pushing force of at least 0.35 kgf. Thus, the fixing structure 2 installed with the formable stopper 21 is unlikely to fall off when the formable stopper 21 encounters vibration of any level. Generally, the interference structure 25 is adapted to withstand a pushing force or a pulling force of at least 0.0001 kgf to 50 kgf.

As shown in FIG. 3, the fixing structure 2 installed with the formable stopper 21 of the present disclosure can be assembled to an object 1. The object 1 includes an installation portion 10, for example, an opening, corresponding to the body 20. The installation portion 10 of the object 1 and the body 20 respectively have a solderable surface 100 and a corresponding solderable surface 201. Moreover, the solder layer 13 is provided at the solderable surface 100 or the corresponding solderable surface 201. The solder layer 13 is heated and liquidized into liquid solder, which is then solidified so as to solder the body 20 to the object 1. The formable stopper 21 can prevent the liquid solder (the heated solder layer 13 in a liquid state) from flowing into the assembly hole 22 during the soldering process. Once the soldering is complete, the formable stopper 21 can be removed from the body 20 to restore an assembly function of the assembly hole 22. A long object, for example, a thimble, may be used to push the formable stopper 21 out of the body 20, or a locking member (not shown), for example, a screw, may be directly locked into the assembly hole 22, to crush the formable stopper 21 into pieces and thus removing it. The object 1 may be a plate, for example but is not limited to, a printed circuit board (PCB). The body 20 may be stored in a carrier (not shown) before it is soldered to the object 1, and is picked up to above the object 1 by a tool (not shown) and placed onto the installation portion 10. The object 1 may be a printed circuit board, a printed circuit board provided with a solder layer, or a printed circuit board provided with a solderable surface on which the solder layer is provided.

Figure 4:
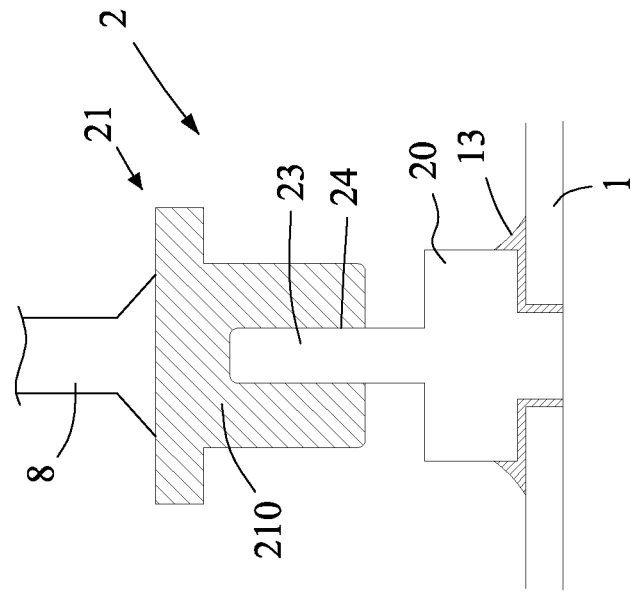
FIG. 4 is a schematic diagram of actions of combining a formable stopper to a fixing structure according to an embodiment of the present disclosure.
Figure 5:
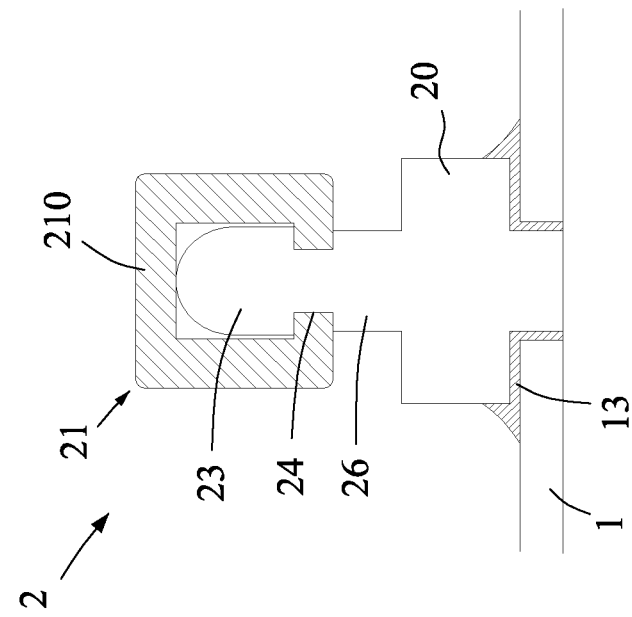
FIG. 5 is a schematic diagram of actions of combining the formable stopper to the fixing structure according to an embodiment of the present disclosure.
Figure 6:
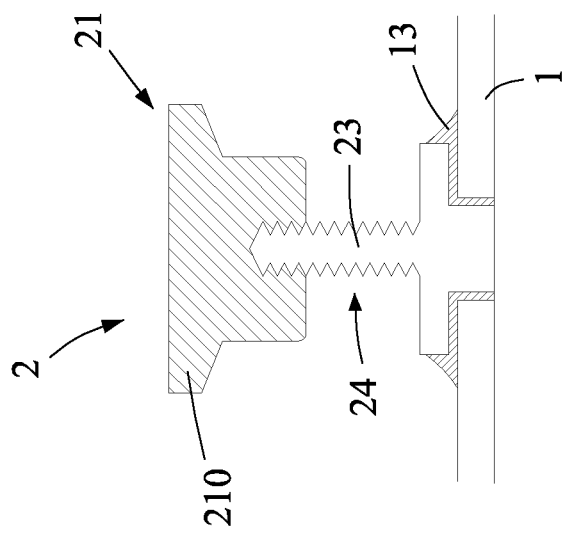
FIG. 6 is a schematic diagram of actions of combining the formable stopper to the fixing structure according to an embodiment of the present disclosure.

Referring to FIG. 4 to FIG. 7, a formable stopper 21 applied to a fixing structure 2 is provided according to other embodiments of the present disclosure. Similar to the above embodiments, the fixing structure 2 includes a body 20. The body 20 has an assembly section 26. The assembly section 26 includes a placement portion 23 and an assembly portion 24, wherein the assembly portion 24 is connected to the placement portion 23. The formable stopper 21 includes a formable body 210. The formable body 210 is adapted to be placed in the placement portion 23, and can be placed into the assembly portion 24 when a force is applied to the formable body 210, thereby achieving an effect of preventing the formable body 210 from falling out of the assembly section 26. The interference force is for picking up the fixing structure 2 via the formable body 210 by a tool during an automated pick-up process. The assembly portion 24 includes a thread structure (as shown in FIG. 6) or a column structure (as shown in FIG. 5). Alternatively, the assembly portion 24 is a fastener having a concave (as shown in FIG. 4). The formable body 210 is adapted to be extruded or fitted into the thread structure or the column structure of the assembly portion 24 so as to form the interference structure 25 or to form a portion of the fixing structure 2.

Figure 7:
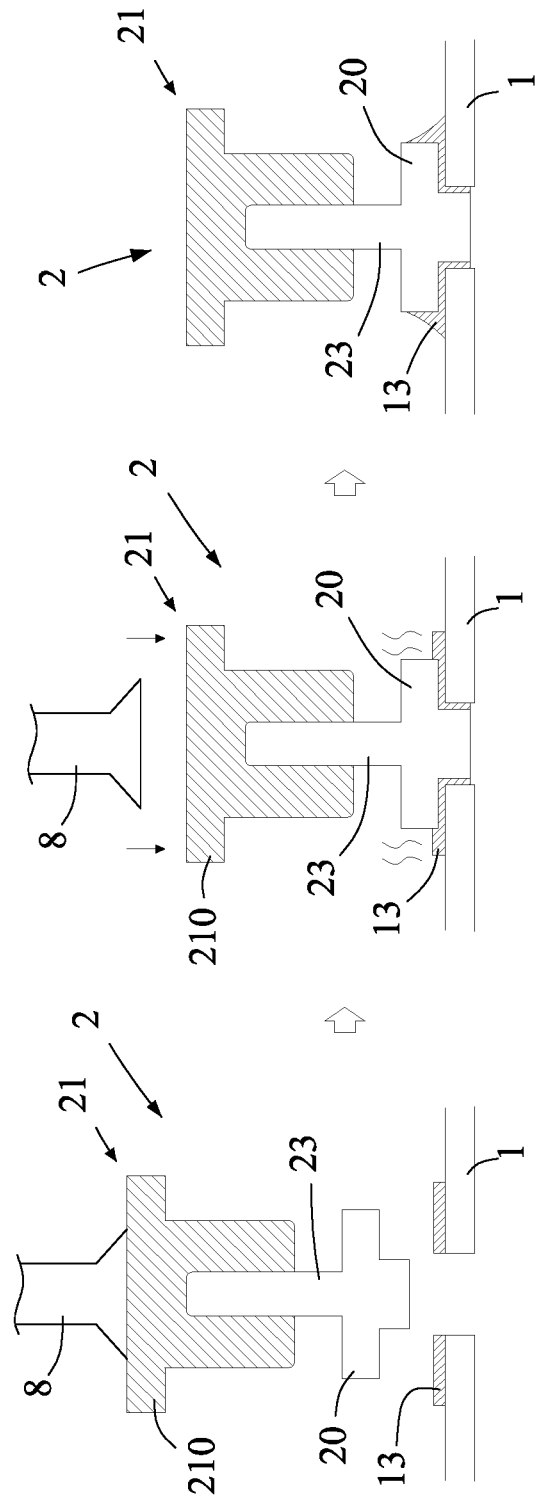
FIG. 7 is a schematic diagram of actions of picking up and soldering the fixing structure to an object by a tool according to an embodiment of the present disclosure.

As shown in FIG. 7, a tool 8 may pick up the fixing structure 2 entirely via the formable body 210 of the formable stopper 21 and place the fixing structure 2 on the object 1 for soldering, and then the tool 8 may leave the formable stopper 21.

As described above, the formable stopper 21 according to an embodiment can be combined to the placement portion 23, so as to serve as the fixing structure 2 to be picked up to a soldering position by the tool 8.

The present disclosure is described by way of the preferred embodiments above. A person skilled in the art should understand that, these embodiments are merely for describing the present disclosure are not to be construed as limitations to the scope of the present disclosure. It should be noted that all equivalent changes, replacements and substitutions made to the embodiments are to be encompassed within the scope of the present disclosure. Therefore, the scope of protection of the present disclosure should be accorded with the broadest interpretation of the appended claims.

What is claimed is:

1. A formable stopper applied to a fixing structure, the fixing structure comprising a body having an assembly hole or an assembly section, the assembly hole or the assembly section comprising a placement portion and an assembly portion, the assembly portion being in communication with or connected to the placement portion, or the placement portion being the assembly portion; the formable stopper comprising:
   a formable body adapted to be extruded, placed, or fitted into the placement portion, and extruded, placed, or fitted into the assembly portion, so as to form an interference structure or to form an interference force for preventing or avoiding the formable body from falling out of the assembly hole or the assembly section,
   wherein the body is for assembling to an object, the object comprises an installation portion corresponding to the body, the installation portion and the body respectively have a solderable surface and a corresponding solderable surface, a solder layer is provided at the solderable surface or the corresponding solderable surface, the solder layer is heated and liquidized into liquid solder, the liquid solder is solidified so as to solder the body to the object, and the formable stopper is adapted to stop the liquid solder from flowing into the assembly portion during a soldering process.

2. The formable stopper according to claim 1, wherein the assembly portion comprises a thread structure or a column structure, and the formable body is adapted to be extruded or fitted into the thread structure or the column structure of the assembly portion so as to form the interference structure or to form a portion of the fixing structure.

3. The formable stopper according to claim 1, wherein the assembly portion comprises a thread structure or a column structure, and the formable body is adapted to be extruded or fitted into the thread structure or the column structure of the assembly portion so as to form the interference structure, and the interference force is for preventing heated liquid solder from flowing into the thread structure during a surface mounting or soldering process, or the interference force is for picking up the fixing structure via the formable body by a tool during an automated pick-up process.

4. The formable stopper according to claim 1, wherein the formable body is made of Teflon, nylon, silicone, rubber, a plastic heat-resistant material, or metal, which does not fall off, fall out, melt, or deform during an implementation in a soldering and heating process or a surface mounting, soldering, and heating process.

5. The formable stopper according to claim 1, wherein the interference structure comprises a filling portion filling the placement portion or an interference portion embedded into the assembly portion.

6. The formable stopper according to claim 1, wherein the assembly portion comprises a thread structure, and the interference structure is at least embedded into a thread of the thread structure.

7. The formable stopper according to claim 1, wherein the interference structure is adapted to withstand a pushing force or a pulling force of at least 0.0001 kgf to 50 kgf.

8. The formable stopper according to claim 1, wherein adapted to be removed from the body when the soldering process is complete.

9. The formable stopper according to claim 1, wherein the formable body is a sheet, a washer, an elastic body, a radius body, a chamfered body, a right-angled body, an arched body, a concave body, a convex body, a stepped body, an inclined surface body, a toothed body, a circular body, a fastener, a spherical body, a curved body, an elastic fastener, a block, a hollow body, a post, or a thread body.

10. The formable stopper according to claim 1, wherein the object is a printed circuit board, a printed circuit board provided with a solder layer, or a printed circuit board provided with a solderable surface on which a solder layer is provided.

11. A formable stopper applied to a fixing structure, the fixing structure comprising a body having an assembly hole or an assembly section, the assembly hole or the assembly section comprising a placement portion and an assembly portion, the assembly portion being in communication with or connected to the placement portion, or the placement portion being the assembly portion; the formable stopper comprising:
   a formable body adapted to be extruded, placed, or fitted into the placement portion, and extruded, placed, or fitted into the assembly portion, so as to form an interference structure or to form an interference force for preventing or avoiding the formable body from falling out of the assembly hole or the assembly section,
   wherein the placement portion or the assembly portion is a radius corner, a chamfered corner, an arched corner, a concave, a convex, a stepped portion, an inclined surface, a column, a screw rod, a toothed portion, a curved surface, or a thread portion, the placement portion and the assembly portion are the same structure, or the placement portion is the assembly portion.

* * * * *